US008725066B2

(12) United States Patent
Kwun et al.

(10) Patent No.: US 8,725,066 B2
(45) Date of Patent: May 13, 2014

(54) APPARATUS AND METHOD FOR ALLOCATING RESOURCE TO MOBILE STATION CONNECTED TO RELAY STATION IN BROADBAND WIRELESS COMMUNICATION SYSTEM

(75) Inventors: Jong-Hyung Kwun, Seongnam-si (KR); Dai-Kwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1346 days.

(21) Appl. No.: 11/841,109

(22) Filed: Aug. 20, 2007

(65) Prior Publication Data

US 2008/0051147 A1 Feb. 28, 2008

(30) Foreign Application Priority Data

Aug. 23, 2006 (KR) .................. 10-2006-0079747

(51) Int. Cl.
*H04B 1/60* (2006.01)
(52) U.S. Cl.
USPC ............ 455/10; 455/13.4; 455/420; 455/418; 455/7; 455/422.1; 370/328
(58) Field of Classification Search
USPC ............ 455/522, 7–25, 422.1, 450–455, 464, 455/509; 370/328–337, 339, 341–348, 370/431–463
See application file for complete search history.

(56) References Cited

U.S. PATENT DOCUMENTS

| | | | | |
|---|---|---|---|---|
| 5,896,411 A * | 4/1999 | Ali et al. | ................. | 375/130 |
| 6,078,812 A * | 6/2000 | Mintz | ................. | 455/434 |
| 6,442,393 B1 * | 8/2002 | Hogan | ................. | 455/456.5 |
| 6,456,608 B1 * | 9/2002 | Lomp | ................. | 370/335 |
| 6,675,013 B1 * | 1/2004 | Gross et al. | ................. | 455/431 |
| 6,731,620 B1 * | 5/2004 | Lim et al. | ................. | 370/335 |
| 6,873,831 B2 * | 3/2005 | Attar et al. | ................. | 455/127.2 |
| 6,963,540 B2 * | 11/2005 | Choi et al. | ................. | 370/252 |
| 6,987,978 B2 * | 1/2006 | Masuda et al. | ................. | 455/456.4 |
| 7,020,436 B2 * | 3/2006 | Schmutz | ................. | 455/9 |
| 7,050,758 B2 * | 5/2006 | Dalgleish et al. | ................. | 455/11.1 |
| 7,327,715 B2 * | 2/2008 | Baker et al. | ................. | 370/349 |
| 7,493,136 B2 * | 2/2009 | Shin et al. | ................. | 455/522 |
| 7,555,261 B2 * | 6/2009 | O'Neill | ................. | 455/11.1 |
| 7,593,472 B2 * | 9/2009 | Chen et al. | ................. | 375/260 |
| 7,751,780 B2 * | 7/2010 | Saidi et al. | ................. | 455/67.11 |
| 2003/0198207 A1 * | 10/2003 | Lee et al. | ................. | 370/337 |
| 2004/0081131 A1 * | 4/2004 | Walton et al. | ................. | 370/344 |
| 2004/0110520 A1 * | 6/2004 | Barbara et al. | ................. | 455/506 |
| 2005/0190700 A1 * | 9/2005 | Melpignano | ................. | 370/244 |
| 2005/0191965 A1 * | 9/2005 | Yu et al. | ................. | 455/67.16 |

(Continued)

FOREIGN PATENT DOCUMENTS

| | | |
|---|---|---|
| KR | 10-2000-0039209 A | 7/2000 |
| KR | 10-2006-0042106 A | 5/2006 |
| KR | 10-2007-0062635 A | 6/2007 |
| WO | 99/23508 A1 | 5/1999 |

*Primary Examiner* — Ronald Eisner
(74) *Attorney, Agent, or Firm* — Jefferson IP Law, LLP

(57) ABSTRACT

An apparatus and method for allocating a resource to a Mobile Station (MS) connected to a Relay Station (RS) in a broadband wireless communication system are provided. In the broadband wires communication system, a Base Station (BS) includes a transmitter for transmitting a pilot signal transmission request message to an MS, and a scheduler for frequency-selectively allocating a resource to the MS by using channel information upon receiving from an RS the channel information estimated using the pilot signal.

44 Claims, 11 Drawing Sheets

(56) References Cited

U.S. PATENT DOCUMENTS

| | | |
|---|---|---|
| 2006/0072604 A1* | 4/2006 | Sutivong et al. ............. 370/437 |
| 2006/0153141 A1* | 7/2006 | Hirano ......................... 370/335 |
| 2007/0060159 A1* | 3/2007 | Utsunomiya et al. ........ 455/450 |
| 2007/0093209 A1* | 4/2007 | Agrawal et al. ............. 455/63.1 |
| 2007/0177541 A1* | 8/2007 | Kwon et al. .................. 370/329 |
| 2007/0195734 A1* | 8/2007 | Das et al. ..................... 370/335 |
| 2008/0051147 A1* | 2/2008 | Kwun et al. .................. 455/561 |
| 2008/0095223 A1* | 4/2008 | Tong et al. .................... 375/228 |
| 2008/0192857 A1* | 8/2008 | Miyoshi et al. ............... 375/285 |
| 2009/0227201 A1* | 9/2009 | Imai et al. ........................ 455/7 |
| 2010/0027462 A1* | 2/2010 | Lee et al. ...................... 370/328 |

* cited by examiner

APPARATUS AND METHOD FOR ALLOCATING RESOURCE TO MOBILE STATION CONNECTED TO RELAY STATION IN BROADBAND WIRELESS COMMUNICATION SYSTEM

PRIORITY

This application claims the benefit under 35 U.S.C. §119 (a) of a Korean patent application filed in the Korean Intellectual Property Office on Aug. 23, 2006 and assigned Serial No. 2006-79747, the entire disclosure of which is hereby incorporated by reference.

BACKGROUND OF THE INVENTION

1. Field of the Invention

The present invention relates to a broadband wireless communication system. More particularly, the present invention relates to an apparatus and method for frequency-selectively allocating a resource to a mobile station connected to a relay station in a broadband wireless communication system.

2. Description of the Related Art

In a next generation communication system, also known as the 4th Generation (4G) communication system, researches are actively in progress to provide a Quality of Service (QoS) with a data transfer speed of about 100 Mbps. More particularly, in a Broadband Wireless Access (BWA) system, such as a wireless Local Area Network (LAN) system and a wireless Metropolitan Area Network (MAN) system, there is research on a communication system that supports a high speed service at the same time as providing mobility and ensuring QoS. An example of such a communication system is an Institute of Electrical and Electronics Engineers (IEEE) 802.16 communication system, which standard is hereby incorporated by reference.

The IEEE 802.16 communication system employs an Orthogonal Frequency Division Multiplexing (OFDM)/Orthogonal Frequency Division Multiple Access (OFDMA) scheme so as to allow a physical channel of the wireless MAN system to support a broadband network.

FIG. 1 illustrates a frame format of a conventional IEEE 802.16 communication system.

Referring to FIG. 1, a frame roughly includes a downlink frame 110 and an uplink frame 120.

The downlink frame 110 includes a preamble 111, a MAP 113 and a downlink data burst 115. The preamble 111 is a signal for synchronizing the frame during communication, and is also used to estimate a channel between a Base Station (BS) and a Mobile Station (MS). The MAP 113 is a signal for broadcasting resource allocation information to a plurality of MSs. The downlink data burst 115 is a signal for data transmitted from the BS to the MS.

The uplink frame 120 includes uplink control information 121 and an uplink data burst 123. The uplink control information 121 is a signal for data in association with resource allocation request, channel quality and so on. The uplink data burst 123 is a signal for data transmitted from the MS to the BS.

In the IEEE 802.16 communication system which uses the aforementioned frame format, an MS estimates a channel by using the preamble 111 received from a BS, and the BS receives information on the channel from the MS by using the uplink control information 121. Accordingly, the BS determines a preferable frequency band by using the channel information, and thus determines a suitable modulation and encoding method.

In order to ensure mobility of the MS and flexibility of implementing a wireless network in the IEEE 802.16 communication system, researches on the further effective provision of services are actively conducted in a wireless environment where traffic distribution and call demands rapidly change. For example, a communication system is taken into account to cope with these demands, in which one fixed (or mobile) Relay Station (RS) or general mobile phones are used to transfer data based on a multi-hop relay scheme.

In the broadband wireless communication system, the RS is used to increase coverage or improve throughput. When the RS is used to increase coverage, the RS receives and relays all signals transmitted from the BS and the MS. On the other hand, when the RS is used to improve throughput, the RS does not relay a control signal (e.g., preamble, MAP message, etc.) and instead relays only user data other than the control signal. That is, the BS and the MS transmit/receive the control signal such as the preamble 111 through a direct link channel and transmit/receive the downlink data burst 115 and the uplink data burst 123 via the RS.

As such, when the RS is used to improve throughput and thus dose not relay the control signal, the MS transmits/receives the control signal through a link between the MS and the BS and transmits/receives data signal through a link between the MS and the RS. The estimated channel information between the MS and the BS is different from information on a channel for transmitting the data signal between the MS and the RS. Therefore, when the RS does not relay the control signal, there is a problem in that a preferable frequency band for a data signal and a suitable modulation/encoding method cannot be determined.

SUMMARY OF THE INVENTION

An aspect of the present invention is to address at least the above-mentioned problems and/or disadvantages and to provide at least the advantages described below. Accordingly, an aspect of the present invention is to provide an apparatus and method for frequency-selectively allocating a resource to a Mobile Station (MS) connected to a Relay Station (RS) in a broadband wireless communication system, when the RS does not relay a control signal.

Another aspect of the present invention is to provide an apparatus and method for adaptively modulating and encoding data using an MS connected to an RS in a broadband wireless communication system, when the RS does not relay a control signal.

Another aspect of the present invention is to provide an apparatus and method for estimating a channel between an RS and an MS in a broadband wireless communication system, when the RS does not relay a control signal.

Another aspect of the present invention is to provide an apparatus and method for reducing interference imposed on an adjacent cell due to a pilot signal when a channel between an RS and an MS connected to the RS is estimated in a broadband wireless communication system, when the RS does not relay a control signal.

Another aspect of the present invention is to provide an apparatus and method for controlling transmission power of a pilot signal when a channel between an RS and an MS connected to the RS is estimated in a broadband wireless communication system, when the RS does not relay a control signal.

According to an aspect of the present invention, an apparatus of a Base Station (BS) in a relay type wireless communication system is provided. The apparatus comprises a transmitter for transmitting a pilot signal transmission request message to an MS and a scheduler for frequency-selectively allocating a resource to the MS by using channel information upon receiving from an RS the channel information estimated using the pilot signal.

According to another aspect of the present invention, an apparatus of an MS in a relay type wireless communication system is provided. The apparatus comprises a receiver for receiving a pilot signal transmission request message to estimate a channel between the MS and an RS, a generator for generating the pilot signal and a transmitter for transmitting the pilot signal.

According to another aspect of the present invention, an apparatus of an RS in a relay type wireless communication system is provided. The apparatus comprises a receiver for receiving a pilot signal from an MS, an estimator for estimating a channel between the RS and the MS by using the pilot signal and a transmitter for transmitting estimated channel information to a BS.

According to another aspect of the present invention, a method of operating a BS in a relay type wireless communication system is provided. The method comprises transmitting a pilot signal transmission request message to an MS, determining whether channel information estimated using the pilot signal is received from an RS and allocating frequency-selectively a resource to the MS by using the channel information.

According to another aspect of the present invention, a method of operating an MS in a relay type wireless communication system is provided. The method comprises determining whether a pilot signal transmission request message is received to estimate a channel between the MS and an RS, generating a pilot signal and transmitting the pilot signal.

According to another aspect of the present invention, a method of operating an RS in a relay type wireless communication system is provided. The method comprises receiving a pilot signal from an MS, estimating a channel between the RS and the MS by using the pilot signal and transmitting estimated channel information to a BS.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A technique will be described hereinafter in which a channel of a Mobile Station (MS) connected to a Relay Station (RS) is estimated in a broadband wireless communication system when the RS does not relay a control signal. Although the broadband wireless communication system to be described below is an Orthogonal Frequency Division Multiplexing (OFDM) communication system, this is for exemplary purpose only. Thus, the present invention may also be applied to a cellular-based communication system using an RS.

Figure 1:
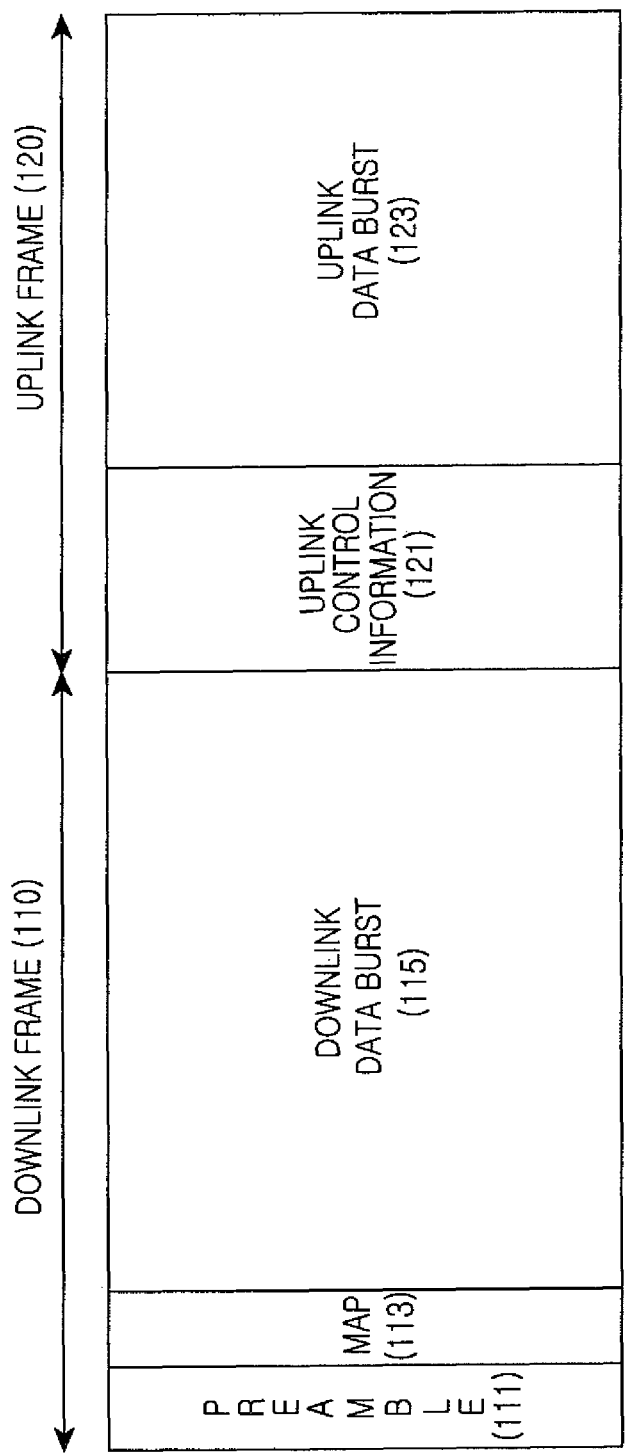
FIG. 1 illustrates a frame format of a conventional IEEE 802.16 communication system.
Figure 2:
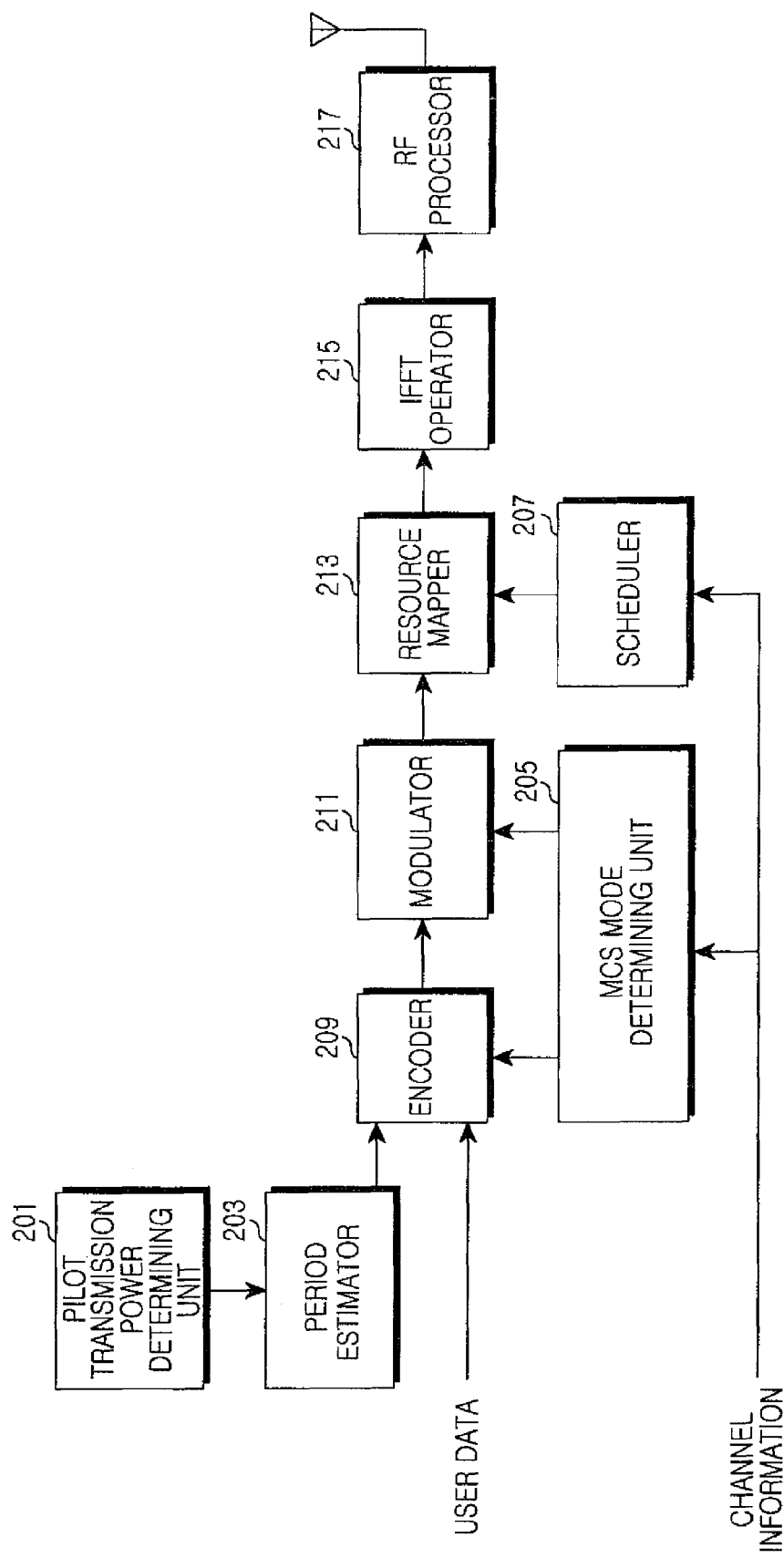
FIG. 2 is a block diagram of a Base Station (BS) in a broadband wireless communication system according to an exemplary embodiment of the present invention.

FIG. 2 is a block diagram of a Base Station (BS) in a broadband wireless communication system according to an exemplary embodiment of the present invention.

Referring to FIG. 2, the BS includes a pilot transmission power determining unit 201, a period estimator 203, a Modulation and Coding Scheme (MCS) mode determining unit 205, a scheduler 207, an encoder 209, a modulator 211, a resource mapper 213, an Inverse Fast Fourier Transform (IFFT) operator 215 and a Radio Frequency (RF) processor 217.

The pilot transmission power determining unit 201 determines transmission power of a pilot signal so as to reduce interference imposed on an adjacent cell when the pilot signal is transmitted. The interference caused by the pilot signal is reduced when the transmission power of the pilot signal is de-boosted in comparison with the case where it is not de-boosted. Herein, the pilot transmission power determining unit 201 operates only when the pilot transmission power of the MS is determined by the BS. An exemplary embodiment of the present invention may not be applied when the pilot transmission power of the MS is determined by the MS. Specifically, when the pilot transmission power of the MS is determined by the BS, signal strength information between the MS and the RS and signal strength information between the MS and the BS are fed back from the BS. Then, the pilot transmission power of the MS is determined using Equation (1).

$$P_{tx,pilot} = RSSI_{DL,BS-MS} - RSSI_{DL,RS-MS} + \alpha_{pilot} \tag{1}$$

In Equation (1), $P_{tx,pilot}$ denotes pilot transmission power of an MS, Received Signal Strength Indicator ($RSSI_{DL,RS-MS}$) denotes a downlink signal strength between an RS and the MS, $RSSI_{DL,BS-MS}$ denotes a downlink signal strength between a BS and the MS, and $\alpha_{pilot}$ denotes an offset for the pilot transmission power. Herein, $\alpha_{pilot}$ is a system dependent value.

The period estimator 203 estimates a request period of the pilot signal according to channel quality variation, and generates a pilot transmission request message according to the estimated period. If the pilot transmission power is determined by the BS, the period estimator 203 generates a pilot transmission request message containing the pilot transmission power information. Otherwise, the period estimator 203 generates a pilot transmission request message not containing the pilot transmission power information. For example, a moving speed of the MS may be measured and thus the period may be determined according to the moving speed. In an exemplary embodiment, the higher the moving speed, the shorter the period, and the lower the moving speed, the longer the period. This is because channel quality variation becomes significant when moving speed is high.

The MCS mode determining unit 205 determines an encoding/modulation method of user data by using the provided channel information, and provides the determination result to the encoder 211 and the modulator 213. That is, in order to overcome poor channel quality, the encoding/modulation method is determined according to a Signal to Noise Ratio (SNR) of the channel, and the determination result is provided to the encoder 211 and the modulator 213.

The scheduler 207 determines a frequency band of each MS by using the provided channel information, and schedules data resource allocation for each MS by using the frequency band. The encoder 209 encodes the provided user data by using the encoding method determined by the MCS mode determining unit 205 at a corresponding encoding rate. The modulator 211 modulates the encoded user data provided from the encoder 211 by using the modulation method determined by the MCS mode determining unit 205.

The resource mapper 213 maps the modulated user data provided from the modulator 211 to frequency and time resources according to the resource allocation scheduling information provided from the scheduler 207. The IFFT operator 215 performs an IFFT operation on the frequency domain signal provided from the resource mapper 213 and thus transforms it to a time domain signal. The RF processor 217 converts a signal provided from the IFFT operator 215 to a carrier frequency band and transmits it through an antenna.

Figure 3:
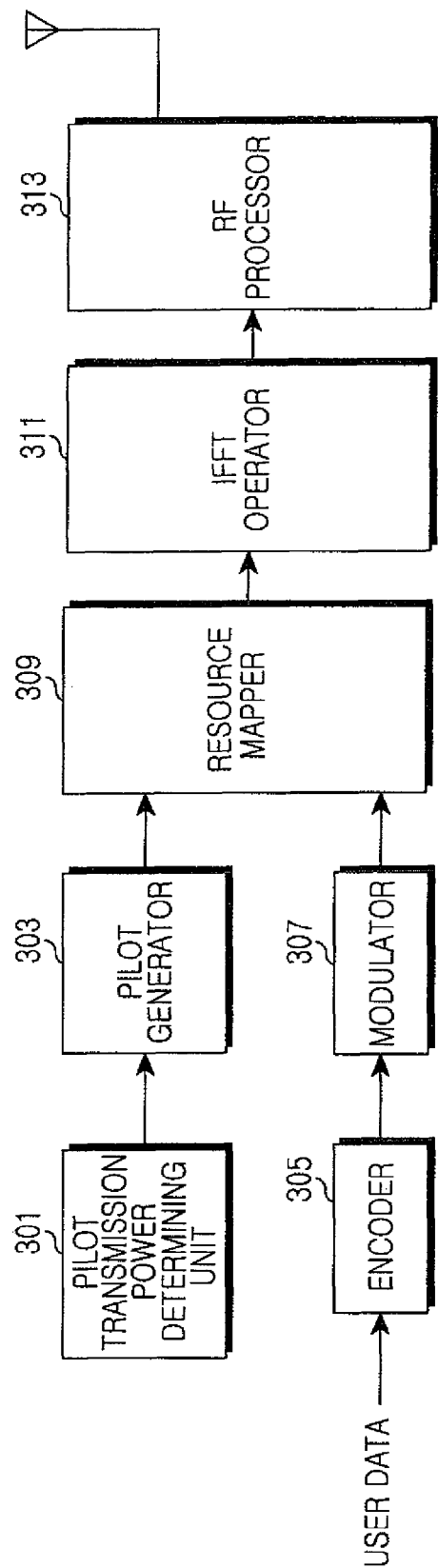
FIG. 3 is a block diagram of a Mobile Station (MS) in a broadband wireless communication system according to an exemplary embodiment of the present invention.

FIG. 3 is a block diagram of an MS in a broadband wireless communication system according to an exemplary embodiment of the present invention.

Referring to FIG. 3, the MS includes a pilot transmission power determining unit 301, a pilot generator 303, an encoder 305, a modulator 307, a resource mapper 309, an IFFT operator 311 and an RF processor 313.

The pilot transmission power determining unit 301 determines transmission power of a pilot signal so as to reduce interference imposed on an adjacent cell when the pilot signal is transmitted. The interference caused by the pilot signal is reduced when the transmission power of the pilot signal is de-boosted in comparison with the case where it is not de-boosted. Herein, the pilot transmission power determining unit 301 operates only when the pilot transmission power is determined by the MS. An exemplary embodiment of the present invention may not be applied when the pilot signal transmission power is determined by the BS. More specifically, when the pilot transmission power is determined by the MS, signal strength information between a BS and the MS is obtained using a control signal, and signal strength information between an RS and the MS is obtained using a received data signal. Then, the pilot transmission power of the MS is determined by using the aforementioned Equation (1).

The pilot generator 303 generates a pilot signal used by the RS to estimate a channel between the MS and the RS upon receiving a pilot transmission request message from the BS. In this case, if the pilot transmission power is determined by the MS, the pilot generator 303 generates a pilot signal whose power has been regulated according to pilot transmission power information provided from the pilot transmission power determining unit 301. In contrast, if the pilot transmission power is determined by the BS, the pilot generator 303 evaluates the pilot transmission power information contained in the pilot transmission request message received through a receiver (not shown), wherein the receiver includes a Fast Fourier Transform (FFT) operator, a demodulator and a decoder. The pilot generator 303 generates a pilot signal whose power has been regulated according to the pilot transmission power information.

The encoder 305 encodes input user data according to a suitable encoding method and encoding rate. The modulator 307 modulates the encoded user data provided form the encoder 305 according to a suitable modulation method. The resource mapper 309 maps the modulated user data provided from the modulator 307 to frequency and time resources allocated to the MS. In particular, when the pilot signal is transmitted according to an exemplary embodiment of the present invention, the resource mapper 309 maps the pilot signal to a sounding channel. The IFFT operator 311 performs an IFFT operation on the frequency domain signal provided from the resource mapper 309 and thus transforms it to a time domain signal. The RF processor 313 converts a signal provided from the IFFT operator 311 to a carrier frequency band and transmits it through an antenna.

Figure 4:
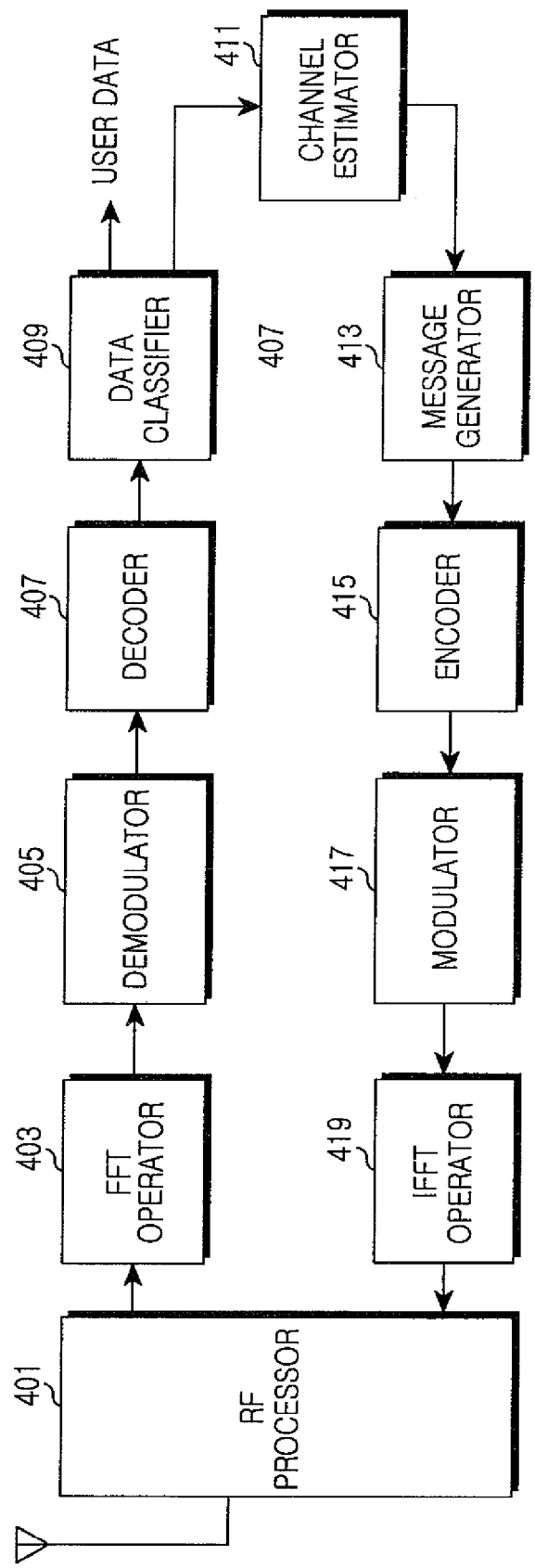
FIG. 4 is a block diagram of a Relay Station (RS) in a broadband wireless communication system according to an exemplary embodiment of the present invention.

FIG. 4 is a block diagram of an RS in a broadband wireless communication system according to an exemplary embodiment of the present invention.

Referring to FIG. 4, the RS includes an RF processor 401, an FFT operator 403, a demodulator 405, a decoder 407, a data classifier 409, a channel estimator 411, a message generator 413, an encoder 415, a modulator 417 and an IFFT operator 419.

The RF processor 401 converts a signal transmitted through an antenna to a baseband signal. Further, the RF processor 401 converts a signal provided from the IFFT operator 419 to a carrier frequency band signal and transmits the transformed signal through the antenna. The FFT operator 403 performs an FFT operation on a time-domain signal provided from the RF processor 401 and thus transforms the time-domain signal to a frequency-domain signal. The demodulator 405 demodulates data provided from the FFT operator 403 according to a suitable demodulation method. The decoder 407 decodes data provided from the demodulator 405 according to a suitable decoding rate and decoding method. The data classifier 409 separates user data and a control signal from the decoded data provided from the decoder 407. In particular, the data classifier 409 separates a pilot signal and outputs it to the channel estimator 411.

The channel estimator 411 estimates a channel between the RS and the MS by using the pilot signal provided from the data classifier 409. The message generator 413 generates a message by which the estimated channel information is transmitted to the BS. The encoder 415 encodes the message provided from the message generator 413 according to a suitable encoding rate and encoding method. The modulator 417 modulates the data provided from the encoder 415 according to a suitable modulation method. The IFFT operator 419 performs an IFFT operation on the data provided from the modulator 417 and thus transforms the data to a time-domain signal.

Figure 5:
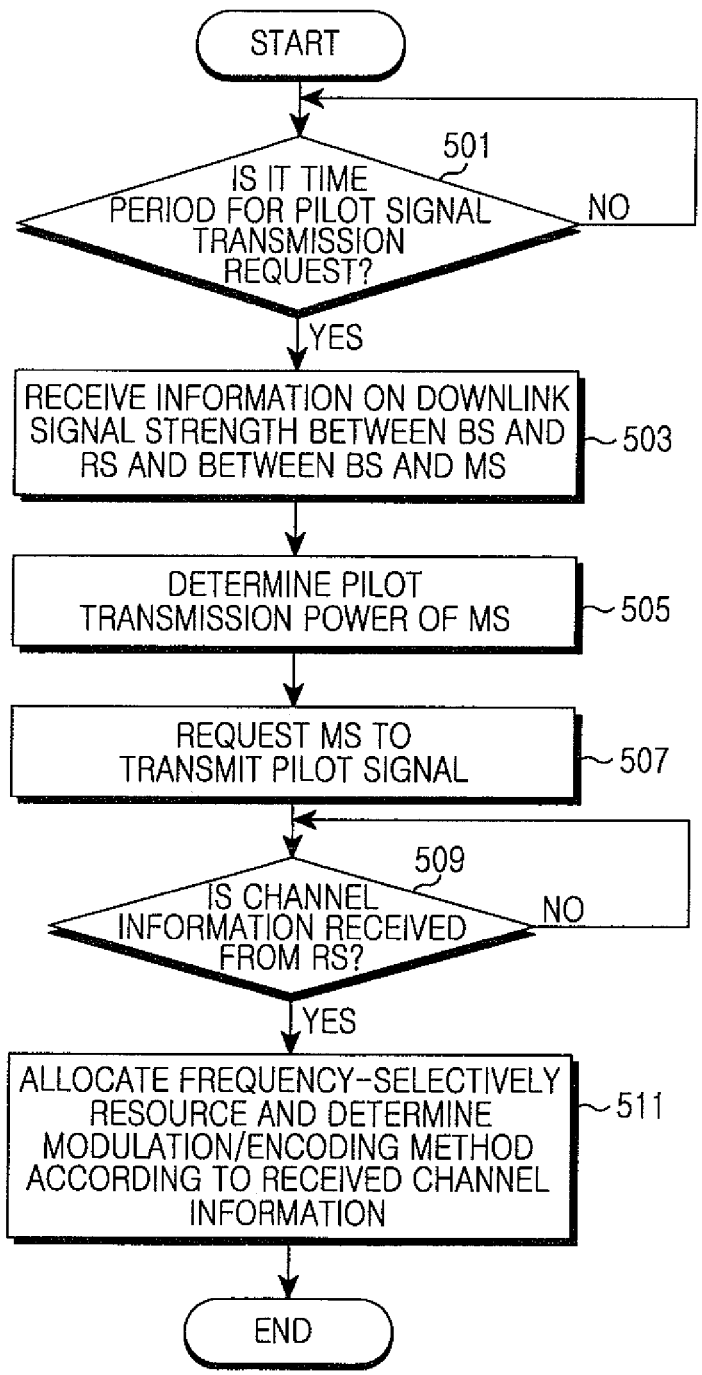
FIG. 5 is a flowchart illustrating a process performed by a BS to frequency-selectively allocate a resource to an MS connected to an RS in a broadband wireless communication system according to an exemplary embodiment of the present invention.

FIG. 5 is a flowchart illustrating a process performed by a BS to frequency-selectively allocate a resource to an MS connected to an RS in a broadband wireless communication system according to an exemplary embodiment of the present invention. The following descriptions will be explained under the assumption that transmission power of a pilot signal transmitted from the MS is determined by the BS.

Referring to FIG. 5, in step 501, according to channel quality variation with respect to the MS, the BS determines whether it is a time period to request the MS to transmit the pilot signal. For example, a moving speed of the MS may be measured and thus the period may be determined according to the moving speed. In an exemplary embodiment, the higher the moving speed, the shorter the period, and the lower the moving speed, the longer the period. This is because channel quality variation becomes significant when the moving speed is high.

If it is the pilot signal transmission request time period, in step 503 the BS receives from the MS information on downlink signal strength between the RS and the MS ($RSSI_{DL,RS-MS}$) and information on downlink signal strength between the BS and the MS ($RSSI_{DL,BS-MS}$). That is, the BS requests the MS to transmit the $RSSI_{DL,RS-MS}$ and the $RSSI_{DL,BS-MS}$, and thus receives the $RSSI_{DL,RS-MS}$ and the $RSSI_{DL,BS-MS}$ from the MS.

In step 505, the BS determines pilot transmission power of the MS. For the case where the pilot transmission power has not been de-boosted, the BS de-boosts the pilot transmission power to reduce the interference imposed on an adjacent cell caused by the pilot signal. In other words, by using the $RSSI_{DL,RS-MS}$ and the $RSSI_{DL,BS-MS}$, the BS determines the pilot transmission power of the MS according to Equation (1) above.

After determining the pilot transmission power, in step 507 the BS requests the MS to transmit the pilot signal. That is, the BS transmits a pilot signal transmission request message including information on the determined pilot transmission power.

In step 509, the BS determines whether channel information between the MS and the RS is received from the RS.

Upon receiving the channel information, in step 511, the BS frequency-selectively allocates a resource to the MS by using the received channel information, and then determines a suitable modulation/encoding method for the MS.

Figure 6:
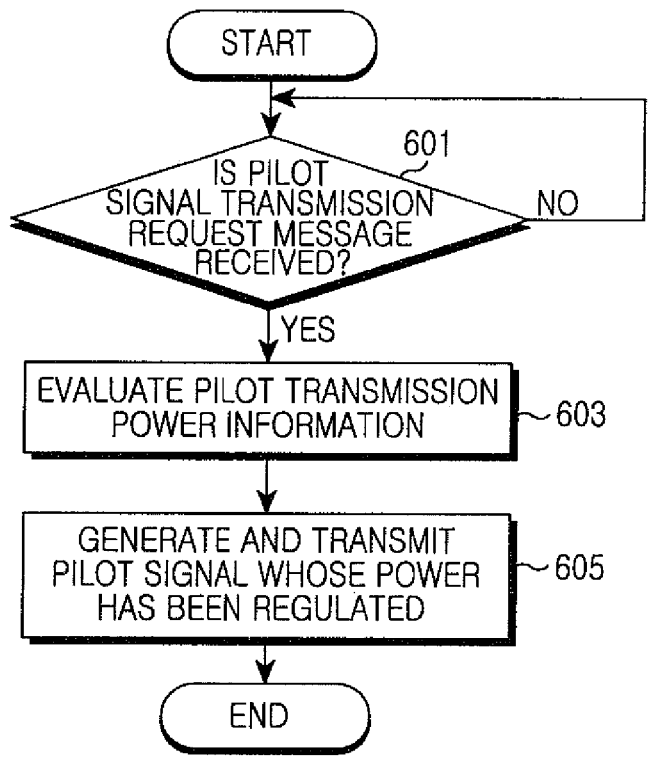
FIG. 6 is a flowchart illustrating a process performed by an MS to estimate a channel between a BS and the MS in a broadband wireless communication system according to an exemplary embodiment of the present invention.

FIG. 6 is a flowchart illustrating a process performed by an MS to estimate a channel between a BS and the MS in a broadband wireless communication system according to an exemplary embodiment of the present invention. The following descriptions will be explained under the assumption that transmission power of a pilot signal transmitted from the MS is determined by the BS.

Referring to FIG. 6, in step 601 the MS determines whether a pilot signal transmission request message is received.

Upon receiving the pilot signal transmission request message, in step 603, the MS evaluates pilot transmission power information included in the message.

In step 605, the MS generates a pilot signal whose power has been regulated according to the pilot transmission power, and transmits the generated pilot signal. Herein, the pilot signal is used by the RS to estimate a channel between the MS and the RS and is transmitted through a sounding channel.

Figure 7:
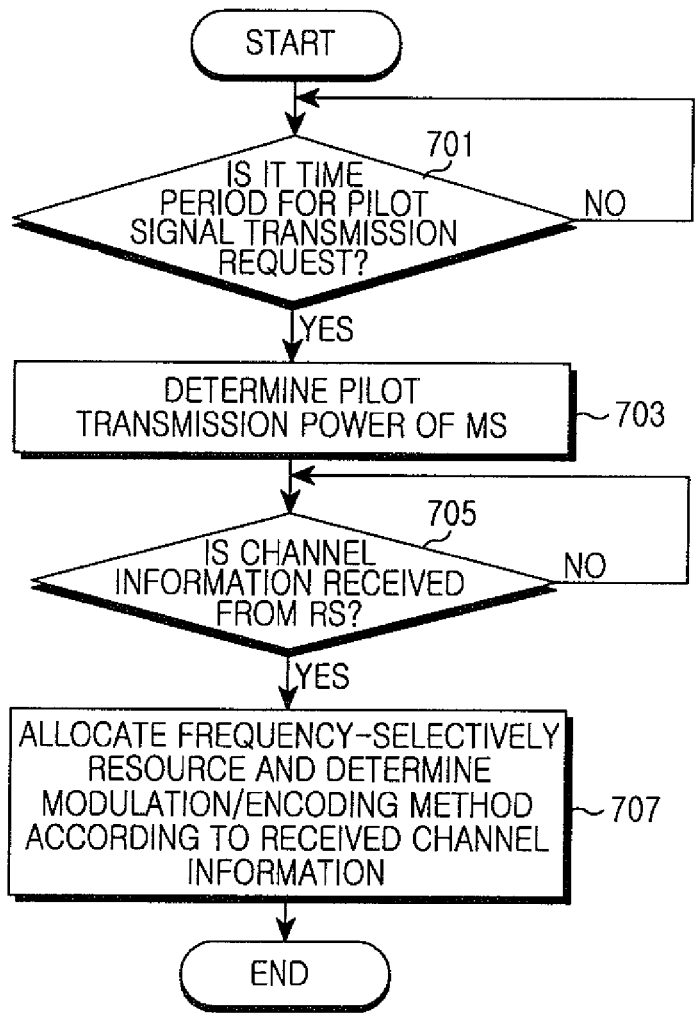
FIG. 7 is a flowchart illustrating a process performed by a BS to frequency-selectively allocate a resource to an MS connected to an RS in a broadband wireless communication system according to an exemplary embodiment of the present invention.

FIG. 7 is a flowchart illustrating a process performed by a BS to frequency-selectively allocate a resource to an MS connected to an RS in a broadband wireless communication system according to an exemplary embodiment of the present invention. The following descriptions will be explained under the assumption that transmission power of a pilot signal transmitted from the MS is determined by the MS.

Referring to FIG. 7, in step 701, according to channel quality variation with respect to the MS, the BS determines whether it is a time period to request the MS to transmit the pilot signal. For example, a moving speed of the MS may be measured and thus the period may be determined according to the moving speed. In an exemplary embodiment, the higher the moving speed, the shorter the period, and the lower the moving speed, the longer the period. This is because channel quality variation becomes significant when the moving speed is high.

If it is the pilot signal transmission request time period, in step 703 the BS requests the MS to transmit the pilot signal.

In step 705, the BS determines whether channel information between the MS and the RS is received from the RS.

Upon receiving the channel information, in step 707 the BS frequency-selectively allocates a resource to the MS by using the received channel information, and then determines a suitable modulation/encoding method for the MS.

Figure 8:
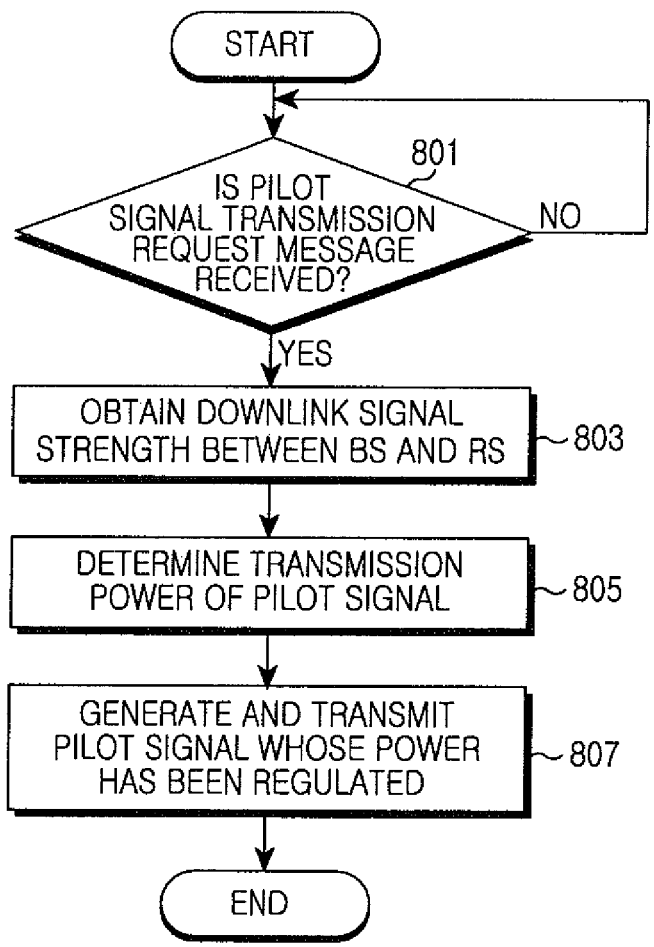
FIG. 8 is a flowchart illustrating a process performed by an MS to estimate a channel between an RS and the MS in a broadband wireless communication system according to an exemplary embodiment of the present invention.

FIG. 8 is a flowchart illustrating a process performed by an MS to estimate a channel between an RS and the MS in a broadband wireless communication system according to an exemplary embodiment of the present invention. The following descriptions will be explained under the assumption that transmission power of a pilot signal transmitted from the MS is determined by the MS.

Referring to FIG. 8, in step 801, the MS determines whether a pilot signal transmission request message is received.

Upon receiving the pilot signal transmission request message, in step 803, the MS obtains $RSSI_{DL,BS-MS}$ and $RSSI_{DL,RS-MS}$. More specifically, the MS obtains the $RSSI_{DL,BS-MS}$ from a control signal received and obtains the $RSSI_{DL,RS-MS}$ from a data signal received.

In step 805, the MS determines pilot transmission power. For the case where the pilot transmission power has not been de-boosted, the MS de-boosts the pilot transmission power to reduce the interference imposed on an adjacent cell caused by the pilot signal. In other words, by using the $RSSI_{DL,RS-MS}$ and the $RSSI_{DL,BS-MS}$, the MS determines the pilot transmission power according to Equation (1) above.

After determining the pilot transmission power, in step 807 the MS generates a pilot signal whose power has been regulated according to the pilot transmission power, and transmits the generated pilot signal. Herein, the pilot signal is used by the RS to estimate a channel between the MS and the RS and is transmitted through a sounding channel.

Figure 9:
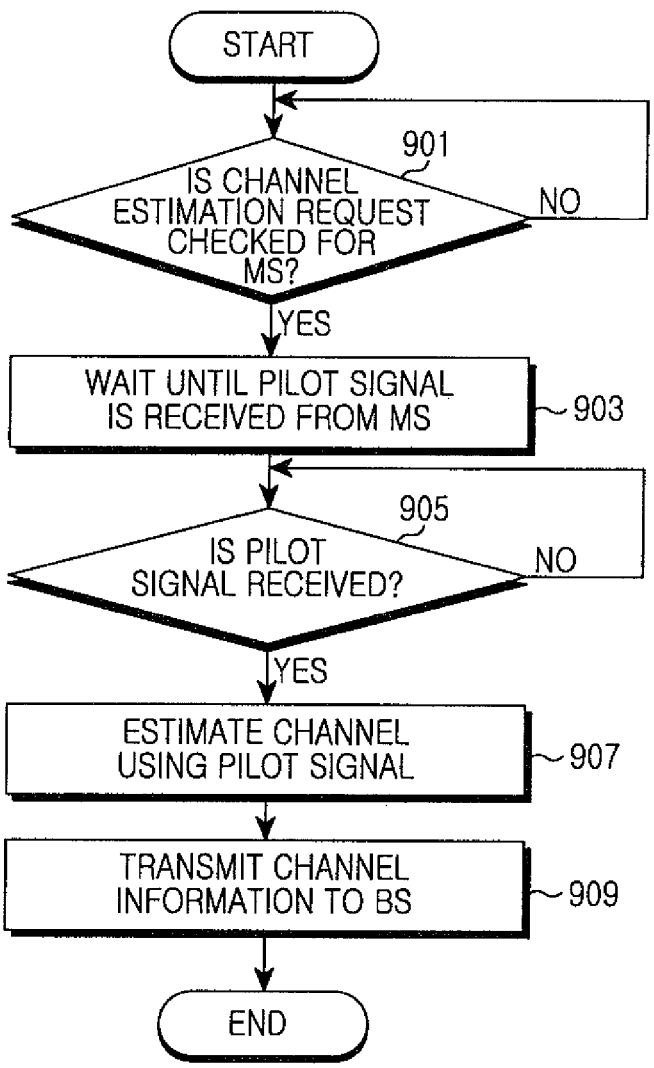
FIG. 9 is a flowchart illustrating a process performed by an RS to provide channel information to a BS in a broadband wireless communication system according to an exemplary embodiment of the present invention.

FIG. 9 is a flowchart illustrating a process performed by an RS to provide channel information to a BS in a broadband wireless communication system according to an exemplary embodiment of the present invention.

Referring to FIG. 9, in step 901 the RS determines whether there is a request for estimating a channel between the MS and the RS. Herein, the request is made by transmitting a pilot transmission request message to the MS. If the message cannot be transmitted to the MS, the request may be checked by using an additional channel estimation request message.

Upon receiving the channel estimation request, in step 903, the RS waits until a pilot signal is received from the MS. In this case, the RS evaluates all signals received through a sounding channel.

In step 905, the RS determines whether the pilot signal is received from the MS.

Upon receiving the pilot signal, in step 907, the RS estimates a channel between the RS and the MS by using the received pilot signal.

In step 909, the RS transmits channel information to the BS.

Figure 10:
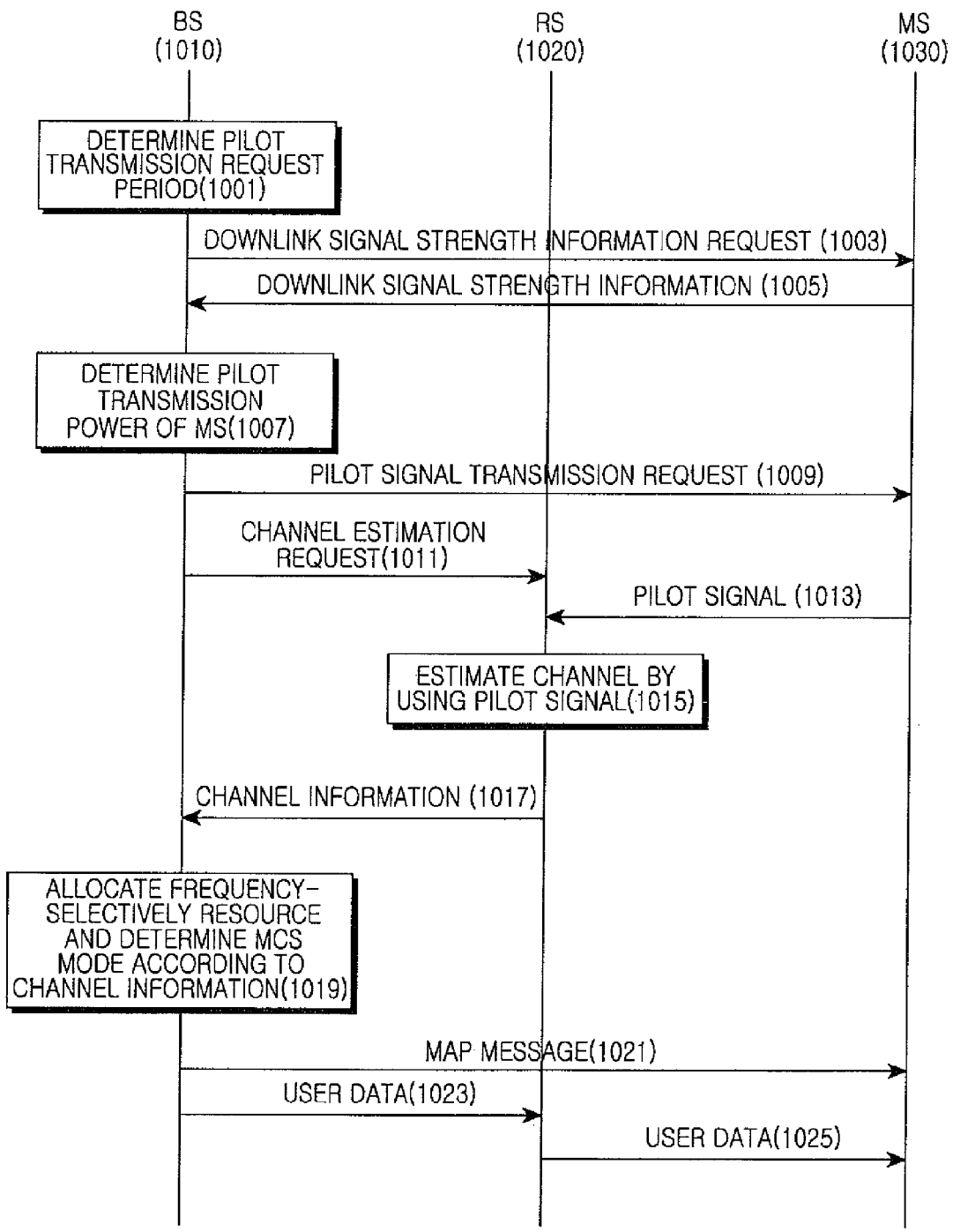
FIG. 10 is a diagram illustrating signal flow among a BS, an RS and an MS in a broadband wireless communication system according to an exemplary embodiment of the present invention.

FIG. 10 is a diagram illustrating signal flow among a BS, an RS and an MS in a broadband wireless communication system according to an exemplary embodiment of the present invention. The following descriptions will be explained under the assumption that transmission power of a pilot signal transmitted from the MS is determined by the BS.

Referring to FIG. 10, according to channel quality variation with respect to an MS 1030, a BS 1010 determines whether it is a time period to request the MS 1030 to transmit the pilot signal in step 1001. For example, a moving speed of the MS 1030 may be measured and thus the period may be determined according to the moving speed. In an exemplary embodiment, the higher the moving speed, the shorter the period, and the lower the moving speed, the longer the period. This is because channel quality variation becomes significant when the moving speed is high.

Next, the BS 1010 requests the MS 1030 to send information on downlink signal strength of signals from an RS and the BS 1010 in step 1003.

Upon receiving the request of information on downlink signal strength, the MS 1030 transmits to the BS 1010 the information on downlink signal strength of signals from the RS and the BS 1010 in step 1005.

Upon receiving the information on downlink signal strength, the BS 1010 determines pilot transmission power of the MS by using Equation (1) above in step 1007.

After determining the pilot transmission power, the BS 1010 requests the MS 1030 to transmit a pilot signal in step 1009. In this case, the BS 1010 also transmits information on the determined pilot transmission power.

Thereafter, the BS 1010 requests an RS 1020 to estimate a channel in step 1011. If the RS 1020 receives a pilot signal transmission request message transmitted from the BS 1010 to the MS 1030, the channel estimation request can be checked through the pilot signal transmission request without an additional process.

Next, the MS 1030 transmits the pilot signal to the RS 1020 in step 1013.

Upon receiving the pilot signal, the RS 1020 estimates a channel between the RS 1020 and the MS 1030 by using the pilot signal in step 1015.

Next, the RS 1020 transmits the estimated channel information to the BS 1010 in step 1017.

Upon receiving the channel information, according to the channel information, the BS 1010 frequency-selectively allocates a resource to the MS 1030 and determines an MCS mode in step 1019.

Next, the BS 1010 transmits a MAP message to the MS 1030 in step 1021.

After transmitting the MAP message, the BS 1010 transmits user data to the MS 1030 via the RS 1020 according to the frequency-selectively allocated resource and the determined MCS mode in steps 1023 and 1025.

Figure 11:
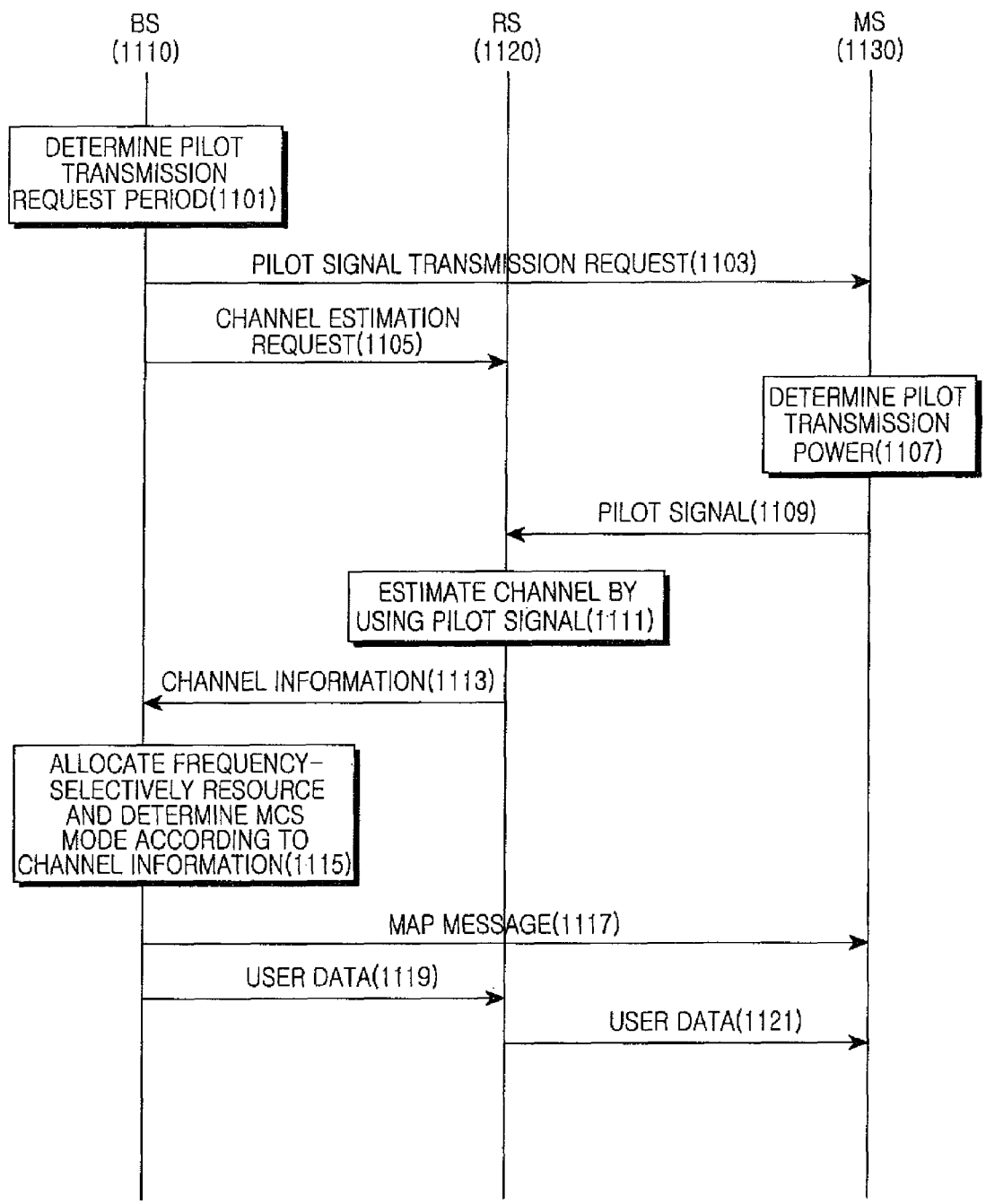
FIG. 11 is a diagram illustrating signal flow among a BS, an RS and an MS in a broadband wireless communication system according to an exemplary embodiment of the present invention.

FIG. 11 is a view for explaining signal flow among a BS, an RS and an MS in a broadband wireless communication system according to an exemplary embodiment of the present invention. The following descriptions will be explained under the assumption that transmission power of a pilot signal transmitted from the MS is determined by the MS.

Referring to FIG. 11, according to channel quality variation with respect to an MS 1130, a BS 1110 determines whether it is a time period to request the MS 1130 to transmit the pilot signal in step 1101. For example, a moving speed of the MS 1130 may be measured and thus the period may be determined according to the moving speed. In an exemplary embodiment, the higher the moving speed, the shorter the period, and the lower the moving speed, the longer the period. This is because channel quality variation becomes significant when the moving speed is high.

Next, the BS 1110 requests the MS 1130 to transmit a pilot signal in step 1103.

Subsequently, the BS 1110 requests an RS 1120 to estimate a channel in step 1105. If the RS 1120 can receive a pilot signal transmission request message transmitted from the BS 1110 to the MS 1130, the channel estimation request can be checked through the pilot signal transmission request without an additional process.

Upon receiving the pilot signal transmission request, the MS 1130 determines pilot transmission power by using Equation (1) above in step 1107.

Next, the MS 1130 transmits the pilot signal to the RS 1120 in step 1109.

Upon receiving the pilot signal, the RS 1120 estimates a channel between the RS 1120 and the MS 1130 by using the pilot signal in step 1111.

Next, the RS 1120 transmits the estimated channel information to the BS 1110 in step 1113.

Upon receiving the channel information, according to the channel information, the BS 1110 frequency-selectively allocates a resource to the MS 1130 and determines an MCS mode in step 1115.

Next, the BS 1110 transmits a MAP message to the MS 1130 in step 1117.

After transmitting the MAP message, the BS 1110 transmits user data to the MS 1130 via the RS 1120 according to the frequency-selectively allocated resource and the determined MCS mode in steps 1119 and 1121.

According to exemplary embodiments of the present invention, in a broadband wireless communication system having an RS that does not relay a control signal, a channel between an MS and the RS is estimated to frequency-selectively allocate a resource and to determine a modulation/encoding method, thereby increasing throughput. In addition, since transmission power of a pilot signal used in the estimated channel is de-boosted for the case where the pilot transmission power has not been de-boosted, it is possible to reduce interference imposed on an adjacent cell caused by the pilot signal.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. An apparatus of a Base Station (BS) in a relay type wireless communication system, the apparatus comprising:
a transmitter for transmitting a pilot signal transmission request message directly from the Base Station (BS) to a Mobile Station (MS), wherein the pilot signal transmission request message instructs the MS to transmit a pilot signal used by a Relay Station (RS) to estimate a channel between the MS and the RS; and
a scheduler for frequency-selectively allocating a resource to the MS by using channel information upon receiving from the RS the channel information estimated using the pilot signal.

2. The apparatus of claim 1, further comprising a deciding unit for generating the pilot signal transmission request message according to a time period and for outputting the generated message to the transmitter.

3. The apparatus of claim 2, wherein the time period is determined according to channel quality variation of the MS.

4. The apparatus of claim 3, wherein the channel quality variation of the MS is determined according to a moving speed of the MS.

5. The apparatus of claim 1, further comprising a power determining unit for determining pilot transmission power of the MS, wherein the pilot signal transmission request message comprises pilot transmission power information.

6. The apparatus of claim 5, wherein the pilot transmission power is determined by using $$P_{tx,pilot} = RSSI_{DL,RS-MS} - RSSI_{DL,BS-MS} + \alpha_{pilot},$$

where $P_{tx,pilot}$ denotes pilot transmission power, Received Signal Strength Indicator ($RSSI_{DL,RS-MS}$) denotes a downlink signal strength between the RS and the MS, $RSSI_{DL,BS-MS}$ denotes a downlink signal strength between the BS and the MS, and $\alpha_{pilot}$ denotes an offset for the pilot transmission power.

7. The apparatus of claim 1, further comprising a Modulation and Coding Scheme (MCS) determining unit for determining a modulation and encoding method of data to be transmitted to the MS by using the channel information.

8. The apparatus of claim 1, wherein the transmitter comprises:
an encoder for encoding a bit-stream;
a modulator for modulating the encoded bit-stream and for converting it to a symbol; and
an operator for generating an Orthogonal Frequency Division Multiplexing (OFDM) symbol by performing an Inverse Fast Fourier Transform (IFFT) operation on the symbol.

9. An apparatus of a Mobile Station (MS) in a relay type wireless communication system, the apparatus comprising:
a receiver for receiving a pilot signal transmission request message at the MS, directly from a Base Station (BS), wherein the pilot signal transmission request message instructs the MS to transmit a pilot signal;
a generator for generating the pilot signal that is used by a Relay Station(RS) to estimate a channel between the MS and the RS in response to the pilot signal transmission request message; and
a transmitter for transmitting the pilot signal.

10. The apparatus of claim 9, further comprising a determining unit for determining pilot transmission power, wherein the generator generates a pilot signal whose power has been regulated according to the pilot transmission power determined by the determining unit.

11. The apparatus of claim 10, wherein the pilot transmission power is determined by using $$P_{tx,pilot} = RSSI_{DL,RS-MS} - RSSI_{DL,BS-MS} + \alpha_{pilot},$$

where $P_{tx,pilot}$ denotes pilot transmission power, Received Signal Strength Indicator ($RSSI_{DL,RS-MS}$) denotes a downlink signal strength between the RS and the MS, $RSSI_{DL,BS-MS}$ denotes a downlink signal strength between the BS and the MS, and $\alpha_{pilot}$ denotes an offset for the pilot transmission power.

12. The apparatus of claim 11, wherein the determining unit obtains a downlink signal strength with respect to the RS by obtaining the strength of the received data signal, and obtains a downlink signal strength with respect to the BS by obtaining a strength of a received control signal.

13. The apparatus of claim 9, wherein the message comprises pilot transmission power information.

14. The apparatus of claim 13, wherein the generator generates a pilot signal whose power has been regulated according to the pilot transmission power information included in the message.

15. The apparatus of claim 9, wherein the pilot signal is transmitted through a sounding channel.

16. The apparatus of claim 9, wherein the transmitter comprises:
an encoder for encoding a bit-stream;
a modulator for modulating the encoded bit-stream and for converting it to a symbol; and
an operator for generating an Orthogonal Frequency Division Multiplexing (OFDM) symbol by performing an Inverse Fast Fourier Transform (IFFT) operation on the symbol.

17. An apparatus of a Relay Station (RS) in a relay type wireless communication system, the apparatus comprising:
a receiver for receiving a pilot signal from a Mobile Station (MS) that is transmitted in response to a pilot signal transmission request message transmitted from a Base Station (BS) directly to the MS and instructs the MS to transmit the pilot signal;
an estimator for estimating a channel between the RS and the MS by using the pilot signal; and
a transmitter for transmitting estimated channel information to the BS.

18. The apparatus of claim 17, wherein the pilot signal is received through a sounding channel.

19. The apparatus of claim 17, wherein the transmitter comprises:
an encoder for encoding a bit-stream;
a modulator for modulating the encoded bit-stream and for converting it to a symbol; and
an operator for generating an Orthogonal Frequency Division Multiplexing (OFDM) symbol by performing an Inverse Fast Fourier Transform (IFFT) operation on the symbol.

20. A method of operating a Base Station (BS) in a relay type wireless communication system, the method comprising:
transmitting a pilot signal transmission request message directly from the Base station (BS) to a Mobile Station (MS), wherein the pilot signal transmission request message instructs the MS to transmit a pilot signal used by a Relay Station (RS) to estimate a channel between the MS and the RS;
determining whether channel information estimated using the pilot signal is received from the RS; and allocating frequency-selectively a resource to the MS by using the channel information.

21. The method of claim 20, wherein the transmitting of the pilot signal transmission request message comprises transmitting the pilot signal transmission request message according to a time period.

22. The method of claim 21, wherein the time period is determined according to channel quality variation of the MS.

23. The method of claim 22, wherein the channel quality variation of the MS is determined according to a moving speed of the MS.

24. The method of claim 20, further comprising determining pilot transmission power of the MS, wherein the pilot signal transmission request message comprises pilot transmission power information.

25. The apparatus of claim 24, wherein the pilot transmission power is determined by using $$P_{tx,pilot} = RSSI_{DL,RS-MS} - RSSI_{DL,BS-MS} + \alpha_{pilot},$$

where $P_{tx,pilot}$ denotes pilot transmission power, Received Signal Strength Indicator ($RSSI_{DL,RS-MS}$) denotes a downlink signal strength between the RS and the MS, $RSSI_{DL,BS-MS}$ denotes a downlink signal strength between the BS and the MS, and $\alpha_{pilot}$ denotes an offset for the pilot transmission power.

26. The method of claim 20, further comprising determining a modulation and encoding method of data to be transmitted to the MS by using the channel information.

27. The method of claim 20, wherein the transmitting of the pilot signal transmission request message comprises:
encoding a bit-stream of the pilot signal transmission request message;
modulating the encoded bit-stream and converting it to a symbol; and
generating an Orthogonal Frequency Division Multiplexing (OFDM) symbol by performing an Inverse Fast Fourier Transform (IFFT) operation on the symbol.

28. A method of operating a Mobil Station (MS) in a relay type wireless communication system, the method comprising:
receiving a pilot signal transmission request message at the mobile station (MS), directly from a base station (BS), wherein the pilot signal transmission request message instructs the MS to transmit a pilot signal;
generating the pilot signal that is used by a Relay Station (RS) to estimate a channel between the MS and the RS in response to the pilot signal transmission request message; and
transmitting the pilot signal.

29. The method of claim 28, further comprising:
determining transmission power of the pilot signal; and
generating the pilot signal whose power has been regulated according to the determined pilot transmission power.

30. The apparatus of claim 24, wherein the pilot transmission power is determined by using $$P_{tx,pilot} = RSSI_{DL,RS-MS} - RSSI_{DL,BS-MS} + \alpha_{pilot},$$

where $P_{tx,pilot}$ denotes pilot transmission power, Received Signal Strength Indicator ($RSSI_{DL,RS-MS}$) denotes a downlink signal strength between the RS and the MS, $RSSI_{DL,BS-MS}$ denotes a downlink signal strength between the BS and the MS, and $\alpha_{pilot}$ denotes an offset for the pilot transmission power.

31. The method of claim 30, wherein the determining of the transmission power of the pilot signal comprises:
obtaining a downlink signal strength with respect to the RS by obtaining the strength of the received data signal; and
obtaining a downlink signal strength with respect to the BS by obtaining a strength of a received control signal.

32. The method of claim 28, wherein the message comprises pilot transmission power information.

33. The method of claim 32, wherein the generating of the pilot signal comprises generating a pilot signal whose power has been regulated according to the pilot transmission power information included in the message.

34. The method of claim 28, wherein the transmitting of the pilot signal comprises transmitting the pilot signal through a sounding channel.

35. The method of claim 28, wherein the transmitting of the pilot signal comprises generating an Orthogonal Frequency Division Multiplexing (OFDM) symbol by performing an Inverse Fast Fourier Transform (IFFT) operation on the symbol.

36. A method of operating a Relay Station (RS) in a relay type wireless communication system, the method comprising:
receiving a pilot signal from a Mobile Station (MS) that is transmitted in response to a pilot signal transmission request message transmitted from a Base Station (BS) directly to the MS and instructs the MS to transmit the pilot signal;
estimating a channel between the RS and the MS by using the pilot signal; and
transmitting estimated channel information to the BS.

37. The method of claim 36, wherein the receiving of the pilot signal comprises receiving the pilot signal through a sounding channel.

38. The method of claim 36, wherein the transmitting of the estimated channel information comprises:
encoding a bit-stream of the channel information;
modulating the encoded bit-stream and converting it to a symbol; and
generating an Orthogonal Frequency Division Multiplexing (OFDM) symbol by performing an Inverse Fast Fourier Transform (IFFT) operation on the symbol.

39. The apparatus of claim 1, wherein the pilot signal transmission request message comprises pilot transmission power information, and wherein the pilot transmission power is determined based on a ratio of a downlink signal strength between the RS and the MS and a downlink signal strength between the BS and the MS.

40. The apparatus of claim 9, wherein the pilot signal transmission request message comprises pilot transmission power information, and wherein the pilot transmission power is determined based on a ratio of a downlink signal strength between the RS and the MS and a downlink signal strength between the BS and the MS.

41. The apparatus of claim 17, wherein the pilot signal transmission request message comprises pilot transmission power information, and wherein the pilot transmission power is determined based on a ratio of a downlink signal strength between the RS and the MS and a downlink signal strength between the BS and the MS.

42. The method of claim 20, wherein the pilot signal transmission request message comprises pilot transmission power information, and wherein the pilot transmission power is determined based on a ratio of a downlink signal strength between the RS and the MS and a downlink signal strength between the BS and the MS.

43. The method of claim 28, wherein the pilot signal transmission request message comprises pilot transmission power information, and wherein the pilot transmission power is determined based on a ratio of a downlink signal strength between the RS and the MS and a downlink signal strength between the BS and the MS.

44. The method of claim 36, wherein the pilot signal transmission request message comprises pilot transmission power information, and wherein the pilot transmission power is determined based on a ratio of a downlink signal strength between the RS and the MS and a downlink signal strength between the BS and the MS.

* * * * *